(12) United States Patent
Ipsen et al.

(10) Patent No.: US 8,663,529 B2
(45) Date of Patent: Mar. 4, 2014

(54) HOLDER AND METHOD FOR SHAPING A SOUND TUBE

(75) Inventors: Klaus Sommer Ipsen, Vanlose (DK); Dennis Norman Andersen, Olstykke (DK)

(73) Assignee: GN Resound A/S, Ballerup (DK)

( * ) Notice: Subject to any disclaimer, the term of this patent is extended or adjusted under 35 U.S.C. 154(b) by 931 days.

(21) Appl. No.: 11/720,304

(22) PCT Filed: Nov. 22, 2005

(86) PCT No.: PCT/DK2005/000741
§ 371 (c)(1),
(2), (4) Date: Aug. 30, 2007

(87) PCT Pub. No.: WO2006/056198
PCT Pub. Date: Jun. 1, 2006

(65) Prior Publication Data
US 2009/0121386 A1     May 14, 2009

Related U.S. Application Data

(60) Provisional application No. 60/631,286, filed on Nov. 26, 2004.

(30) Foreign Application Priority Data

Nov. 26, 2004  (DK) .................................. 2004 01849

(51) Int. Cl.
*B29C 53/08*     (2006.01)
*H04R 25/00*     (2006.01)

(52) U.S. Cl.
USPC ........... 264/285; 264/280; 425/383; 425/392; 425/397; 425/403.1; 381/330

(58) Field of Classification Search
USPC ............... 425/383, 392, 397, 403.1; 264/280, 264/285; 381/330
See application file for complete search history.

(56) References Cited

U.S. PATENT DOCUMENTS 1,453,917 A * 5/1923 Chambers ................... 72/390.6
1,737,084 A * 11/1929 Hilstad .......................... 72/458
(Continued)

FOREIGN PATENT DOCUMENTS

DE        3939352 A1    6/1991
DE     101 29 305 A1    12/2002
(Continued)

OTHER PUBLICATIONS

National Library of Australia "Joe Price 1", "http://newspapers.nla.gov.au/ndp/imageservice/nla.news-page1128701".*

(Continued)

*Primary Examiner* — Milton I Cano
*Assistant Examiner* — Jeremiah Smith
(74) *Attorney, Agent, or Firm* — Vista IP Law Group, LLP

(57) ABSTRACT

The present invention relates to a simplified manufacturing method for provision of a sound tube with a pre-formed shape, especially a sound tube for use in a BTE (Behind-The-Ear) hearing aid utilizing a holder with an external surface for imparting the shape of the surface to the sound tube, a first attachment element that is adapted to receive and hold a first connector at a first end of the sound tube, and a second attachment element that is adapted to receive and hold a second connector at a second end of the sound tube thereby keeping the sound tube in abutting contact with at least parts of the external surface whereby the external surface imparts the shape of the surface to the sound tube.

57 Claims, 9 Drawing Sheets

(56) References Cited

U.S. PATENT DOCUMENTS

| | | | | |
|---|---|---|---|---|
| 2,835,282 | A * | 5/1958 | Schmuldt | 140/105 |
| 3,045,073 | A | 7/1962 | Vickerson | |
| 3,237,658 | A * | 3/1966 | Ehmann | 140/104 |
| 3,672,408 | A * | 6/1972 | Dubrfuil et al. | 140/102 |
| 3,718,018 | A * | 2/1973 | Benfield | 72/31.05 |
| 4,381,830 | A | 5/1983 | Jelonek et al. | |
| 4,677,675 | A | 6/1987 | Killion et al. | |
| 5,772,420 | A * | 6/1998 | Holmes | 425/588 |
| 6,009,183 | A * | 12/1999 | Taenzer et al. | 381/330 |
| 6,228,307 | B1 | 5/2001 | Kastl et al. | |
| 6,275,596 | B1 | 8/2001 | Fretz et al. | |
| 2002/0172386 | A1 | 11/2002 | Bayer | |
| 2002/0198437 | A1 * | 12/2002 | Juneau et al. | 600/25 |
| 2003/0002700 | A1 * | 1/2003 | Fretz et al. | 381/330 |
| 2003/0133583 | A1 * | 7/2003 | Widmer et al. | 381/328 |
| 2006/0133634 | A1 * | 6/2006 | Berg | 381/328 |
| 2006/0215864 | A1 * | 9/2006 | Espersen et al. | 381/330 |
| 2007/0182067 | A1 * | 8/2007 | Fickweiler et al. | 264/401 |
| 2007/0242845 | A1 * | 10/2007 | Westermann | 381/330 |
| 2009/0074221 | A1 * | 3/2009 | Westermann | 381/327 |

FOREIGN PATENT DOCUMENTS

| | | | | |
|---|---|---|---|---|
| EP | 0695108 | A2 | 1/1996 | |
| EP | 0695108 | A3 | 2/1997 | |
| EP | 1448014 | A1 | 8/2004 | |
| EP | 1808286 | | 12/2006 | |
| GB | 902 745 | | 8/1962 | |
| JP | 57-124821 | | 7/1982 | |
| JP | 58-045154 | | 3/1983 | |
| JP | 59014918 | | 1/1984 | |
| JP | 02040694 | | 2/1990 | |
| JP | 08216246 | | 8/1996 | |
| JP | 09-273665 | | 9/1997 | |
| JP | 20000326398 | | 11/2000 | |
| WO | 97/07969 | A1 | 3/1997 | |
| WO | 9904601 | | 1/1999 | |
| WO | WO 2006/066570 | * | 6/2006 | H04R 25/00 |
| WO | WO 2007/000160 | * | 1/2007 | B29C 53/08 |

OTHER PUBLICATIONS

Golf Drivers Reviews.org "Joe Price 2", "http://www.golfdriver-reviews.org/golf-shaft-selection.html".*
English Abstract for Japanese Patent No. 57-124821, filed on Jul. 17, 1982.
English Abstract for Japanese Patent No. 09-273665, filed on Sep. 20, 1997.
English Abstract for Japanese Patent No. 58-045154, filed on Mar. 16, 1983.
International Search Report for International Application No. PCT/DK20051000741, Dated May 19, 2006.
Written Opinion of the International Search Authority for International Application No. PCT/DK2005/000741, Dated May 19, 2006.
Danish Office Action for PA 2004 01849, Dated Oct. 11, 2005.
International Type Search Report for PA 2004 01849, Dated Jun. 24, 2005.

* cited by examiner

HOLDER AND METHOD FOR SHAPING A SOUND TUBE

This application is a §371 National Stage application of PCT/DK2005/000741, filed on Nov. 22, 2005, which claims the benefit and priority to U.S. Provisional Patent Application No. 60/631,286, filed on Nov. 26, 2004, and Denmark Application No. PA 2004 01849, filed on Nov. 26, 2004, the disclosures of all of which are expressly incorporated by reference herein.

FIELD OF THE INVENTION

The present invention relates to a simplified manufacturing method for provision of a sound tube with a pre-formed shape, especially a sound tube for use in a BTE (Behind-The-Ear) hearing aid.

BACKGROUND OF THE INVENTION

Behind-the-ear hearing aids wherein sound signals propagate as acoustic signals from a receiver positioned in the hearing aid housing behind the ear and through a sound tube into the ear canal are well known in the art.

In order to position the sound tube securely and comfortably in the ear canal, an earpiece, shell, or earmould is provided for attachment to the sound tube and insertion into the ear canal of the user.

Typically, a first end of the sound tube is attached to a first connector for coupling of the sound tube to the BTE housing containing the electronics of the hearing aid, and a second end of the sound tube is attached to a second connector for coupling of the sound tube to the earpiece. The sound tube is typically flexible so that the sound tube is allowed to bend and provide the required arcuate propagation path of the sound from the receiver output.

In the BTE hearing aid disclosed in EP 1 448 014, the sound tube has a pre-formed shape that includes a first bend extending from the first connector over the top of the ear of the user and a second bend extending from an outside of the ear into an ear canal of the user when the hearing aid is worn by the user.

It is also known to manufacture the sound tube with the first and second connectors in one unit in different standard sizes, for example with different lengths between the first and the second bend, e.g. 4 different lengths, and different lengths between the second bend and the earpiece, e.g. 2 different lengths, to fit the human anatomy of the ear of most users. Further, the sound tubes may be fitted with earpieces or shells of different sizes e.g. 3 different standard sizes, or custom mold. Finally, the sound tube has to be manufactured with bends adapted to the right ear and bends adapted to the left ear. The present example leads to 48 (4*2*3*2) standard sizes of the unit to be manufactured and to be kept in stock by the hearing aid dispensers. Still further, the sound tube may be delivered with various diameters.

In WO 99/04601 a method of producing a sound tube with a pre-formed shape is disclosed, comprising the steps of overmoulding a connector member and an earpiece to respective ends of the sound tube, positioning of a formed wire within the tube, thus bending the tube to the desired shape, heating of the tube with the wire to about 120° C. to shape the tube, cooling, and removal of the wire. Upon cooling, the tube retains the shape of the wire.

This method is cumbersome, slow and labour intensive. Thus, there is a need for a more expedient and cost effective method of producing a sound tube with a pre-formed shape.

SUMMARY OF THE INVENTION

According to a first aspect of the present invention, the above and other objects are fulfilled by provision of a holder for shaping a sound tube for a BTE hearing aid, the holder comprising attachment elements for holding specific parts of the sound tube in respective specific positions thereby imparting a specific shape to the sound tube.

In one embodiment of the invention, sound signals propagate as acoustic signals from a receiver positioned in the hearing aid housing behind the ear and through the sound tube into the ear canal.

Sound signals may alternatively propagate through a conductor as electrical signals from the output of a signal processor in the hearing aid housing behind the ear to a receiver that is positioned in the ear canal for emission of sound towards the eardrum.

Throughout the present description, the sound tube may be adapted for conduction of acoustic signals, or, may be adapted for conduction of electrical signals.

Inherent tensions in the sound tube material may lead to differences between a) the specific shape imparted to the sound tube by the holder before heating and cooling and b) the desired shape assumed by the sound tube upon cooling and release from the holder. Resilience of the sound tube may for example straighten the sound tube slightly upon release from the holder whereby the radius of curvature of bends of the sound tube is slightly increased. The person skilled in the art will know how to compensate for this effect by provision of a holder imparting a specific shape to the sound tube from which specific shape the sound tube will assume the desired shape upon heating, cooling, and release from the holder.

In one embodiment, the attachment elements comprises gripping devices, each gripping device holding a specific part of the sound tube in a specific position thereby imparting the specific shape to the sound tube.

The attachment elements may be adapted to impart a first bend to the sound tube, the first bend being intended to extend from a BTE hearing aid housing to be worn behind the ear and over the top of the ear of a user when the user wears the hearing aid.

The attachment elements may further be adapted to impart a second bend to the sound tube, the second bend being intended to extend from an outside of the ear into an ear canal of the user when the user wears the hearing aid.

The holder may further comprise a surface for imparting the specific shape to the sound tube, and the attachment elements may further be adapted for fixing the sound tube to the holder keeping the sound tube in abutting contact with at least parts of the surface.

The surface of the holder may be curved to impart the first bend to the sound tube, the first bend being intended to extend from a BTE hearing aid housing to be worn behind the ear and over the top of the ear of a user when the user wears the hearing aid with the pre-formed sound tube.

The surface imparting the first bend may further comprise a groove for reception and accommodation of the sound tube.

The surface of the holder may further be curved to impart the second bend to the sound tube, the second bend being intended to extend from outside the ear into the ear canal of the user when the user wears the hearing aid with the pre-formed sound tube.

Preferably, the holder has a flat bottom surface for easy positioning of the holder on a conveyor belt.

The first end of the sound tube may be attached to a first connector for coupling of the sound tube to the BTE housing containing the electronics of the hearing aid. Further, the second end of the sound tube may be attached to a second connector for coupling of the sound tube to the earpiece.

The attachment elements of the holder may comprise a first element that is adapted to receive and hold the first connector for connection of the sound tube with the BTE hearing aid housing.

The attachment elements of the holder may further comprise a second element that is adapted to receive and hold the second connector for connection of the sound tube with the earpiece.

Thus, in one embodiment of the invention, a holder is provided for shaping a sound tube for a BTE hearing aid, the sound tube having a first end with a first connector and a second end with a second connector, the holder having an external surface for imparting the shape of the surface to the sound tube, a first attachment element that is adapted to receive and hold the first connector, a second attachment element that is adapted to receive and hold the second connector thereby keeping the sound tube in abutting contact with at least parts of the external surface whereby the external surface imparts the shape of the surface to the sound tube.

The first connector may be over-moulded onto the sound tube. Alternatively, the first connector may be moulded and bonded to the tube thereafter.

Likewise, the second connector may be over-moulded onto the sound tube, or, the second connector may be moulded and bonded to the tube thereafter.

The second connector may comprise a plug to be connected with the earpiece for attachment of the sound tube to the earpiece, e.g. by bayonet coupling or gluing, etc.

The sound tube and the first and second connectors may be moulded to form one integrated unit.

In a preferred embodiment of the invention, the sound tube has an inner diameter ranging from about 0.5 mm to about 2 mm. The tube is preferably formed of a material with a durometer of 50 to 85 Shore D.

In a preferred embodiment of the invention, the earpiece is provided in standard sizes substituting custom made earpieces. In order for the standard sized earpiece to be comfortably and reliably fastened in the ear canal of a user, the earpiece is provided with at least one resilient fibre that is connected to the earpiece for abutting a surface of the outer ear when the earpiece is inserted in the ear canal thereby providing retention of the earpiece in the ear canal of the user.

In a preferred embodiment, the at least one fibre is connected to the earpiece via the sound tube. However, in another embodiment the at least one fibre is connected directly to the earpiece.

The earpiece is configured to fit within the ear canal, preferably, without blocking the ear canal so that sound from outside the ear is allowed to propagate through the ear canal, past the earpiece, and to the tympanic membrane. Preferably, the fibre is adapted for abutting the outer ear at the bottom of the ear, e.g. behind the antitragus at the lower part of the concha, at which position the fibre is substantially invisible and provides secure retention of the earpiece in the ear canal.

The earpiece, the sound tube, the connectors, and the fibre may be moulded to form one integrated unit, or, the sound tube, the connectors, and the fibre may be moulded to form one integrated part to be assembled with the earpiece.

Alternatively, the fibre may be connected to the sound tube with a connector member. The connector member may be over-moulded onto the sound tube and the fibre. Alternatively, the connector member may be moulded first and then bonded to the tube and fibre, respectively.

Preferably, the fibre has an outer diameter of about 1.0 to 1.6 mm, more preferred, about 1.2 mm.

The fibre is preferably produced from a material, which can be formed in a pre-formed shape and exhibits sufficient rigidity to hold the earpiece within the ear canal and retains its shape when positioned in the ear. Examples of fibre materials include REP Teflon, Nylon, PEBAX, silicone, polyurethane, PTFE (polytetrafluoroethylene), EVA (ethylvinylacetate), etc. The material of the fibre may have a shore hardness of about 65 to 85 Shore D, preferably about 72 Shore D.

The resilience of the fibre allows the fibre to apply a force to the earpiece towards the ear canal to retain the earpiece in a position in which the earpiece is pressed against an anatomical feature within the ear canal.

The earpiece material may be a soft elastomer, such as silicone rubber or other soft plastic. The earpiece material preferably has a durometer of about 30 Shore A.

The holder may comprise further attachment elements that are adapted to receive and hold the resilient fibre that is connected to the sound tube and intended for abutting a lower part of the concha when the hearing aid is worn thereby providing retention of the hearing aid earpiece in the ear canal of the user.

Due to its complex geometry, the holder is preferably manufactured utilising selective laser sintering wherein a laser beam is scanned over the surface of a tightly compacted powder made of a thermoplastic material. Heat from the laser melts the powder where it strikes causing sintering of the powder.

Preferably, the holder is made of a material, such as a plastic material, such as polystyrene, etc., that has thermal properties compatible with the material of the sound tube so that the holder follows the thermal extension and compression of the sound tube during heating and cooling. The holder may endure more than a thousand heating and cooling cycles.

According to a second aspect of the present invention, the above and other objects are fulfilled by provision of a method of imparting the specific shape to the sound tube for a BTE hearing aid, comprising the steps of unreeling a desired length of sound tube from a storage reel, cutting the desired length of sound tube, overmoulding the first connector, overmoulding the second connector, mounting the sound tube onto the holder by attaching the first connector to the first attachment element, bending the sound tube along the external surface and attaching the second connector to the second attachment means, and heating the holder with the sound tube, cooling the holder with the sound tube, and removing the sound tube from the holder.

BRIEF DESCRIPTION OF THE DRAWINGS

Below, the invention will be further described and illustrated with reference to the accompanying drawings in which.

DETAILED DESCRIPTION OF PREFERRED EMBODIMENTS

Figure 1:
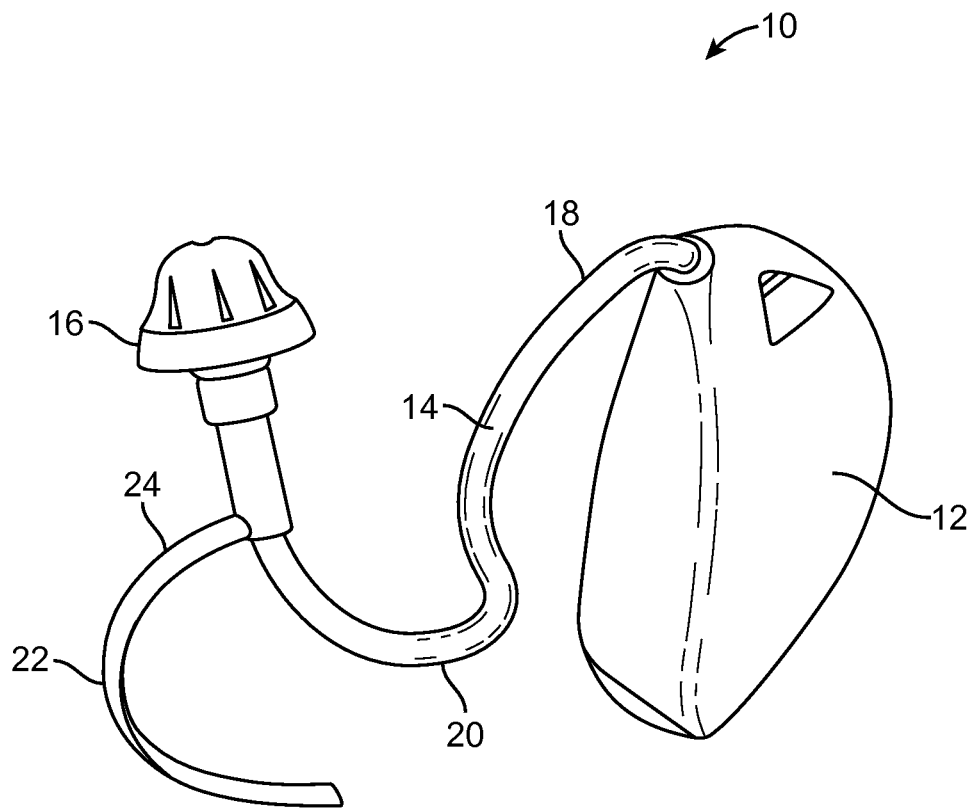
FIG. 1 is a perspective view of a prior art BTE hearing aid with an open earpiece.

FIG. 1 shows in perspective a prior art BTE hearing aid 10. The BTE hearing aid 10 comprises a hearing aid housing 12, a sound tube 14 having a pre-formed shape for conducting sound from the hearing aid housing 12 to the ear canal (not shown), and an earpiece 16 attached to the sound tube 14 for insertion into the ear canal.

The hearing aid housing 12 is configured to be worn behind the ear of a user and contains a battery, a microphone, a processor, and a receiver (not shown) for generating sound that is input into the sound tube 14.

The pre-formed shape of the sound tube 14 includes a first bend 18 extending from the case over the top of the ear of the user and a second bend 20 extending from an outside of the ear into an ear canal of the user when the hearing aid 10 is worn by the user.

The earpiece 16 is configured to fit within the ear canal and, preferably, allows sounds outside and within the ear to pass through the ear canal around the earpiece.

Further, the hearing aid 10 has an arcuate, preferably resilient, fibre 22 with one end 24 that is connected to the first connector. The fibre 22 is adapted for abutting a surface of the outer ear when the earpiece 16 has been inserted in the ear canal thereby providing retention of the earpiece 16 in the ear canal of the user.

Figure 2:
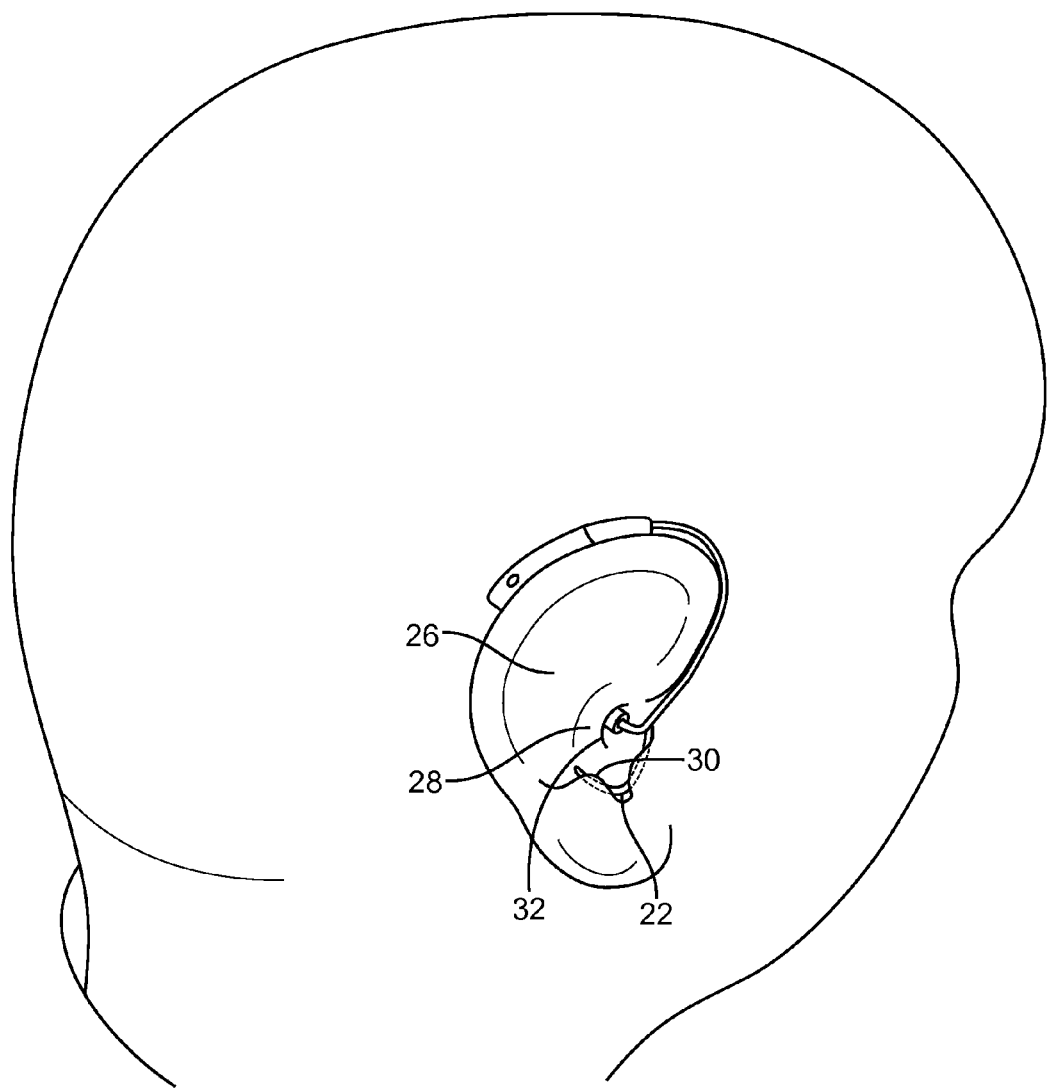
FIG. 2 is a photo providing a side view of a prior art BTE hearing aid positioned at a user's right ear.
Figure 3:
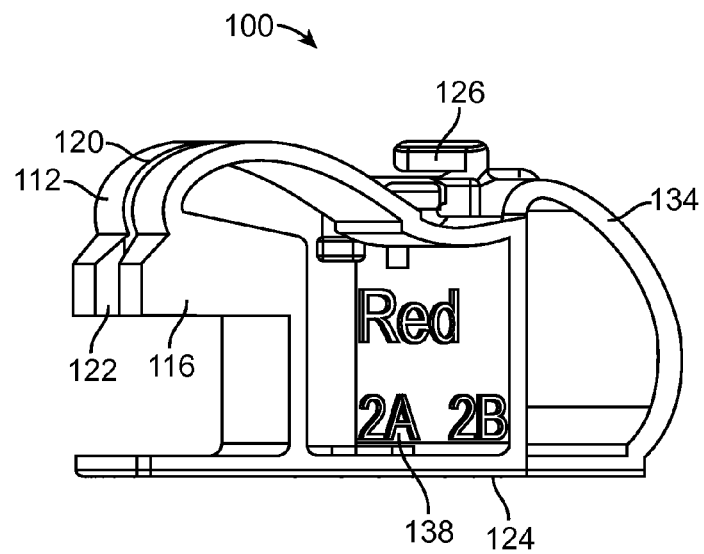
FIG. 3 is a perspective view of a holder according to the present invention.

FIG. 2 is a photo that illustrates correct positioning of the hearing aid shown in FIG. 1 at the ear of a user. The fibre and the sound tube have been coloured to make them more visible on the photograph for illustration purposes only. The fibre 22 is adapted for abutting the outer ear 26 at the lower part of the concha 28 behind the antitragus 30 at which position the fibre 22 is substantially invisible and provides secure retention of the earpiece 16 in the ear canal 32.

The resilience of the fibre allows the fibre to apply a force to the earpiece towards the ear canal to retain the earpiece in a position in which the earpiece is pressed against an anatomical feature within the ear canal.

The illustrated earpiece is provided in standard sizes and is comfortable to wear and aesthetical and the fibre 22 enables it to be securely and comfortably fastened in the ear canal of a user.

Figure 6:
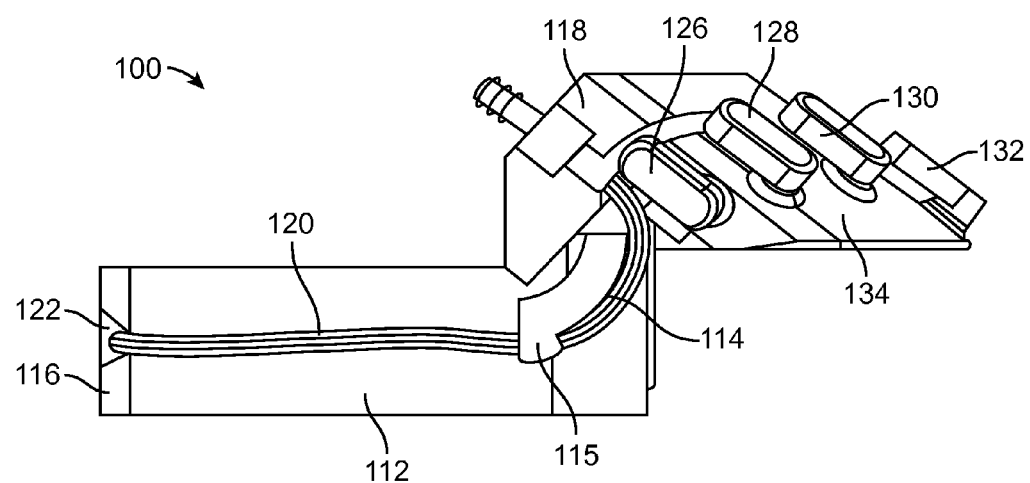
FIG. 6 is a photo of the holder shown in FIGS. 3-5 viewed from above and with the sound tube attached.
Figure 7:
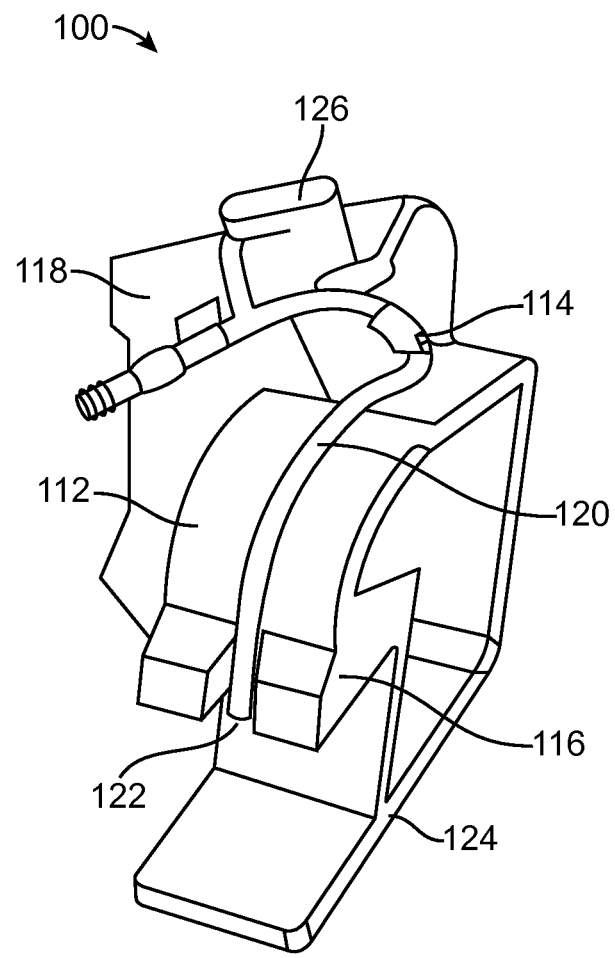
FIG. 7 is a photo of the front of the holder of FIG. 6.
Figure 8:
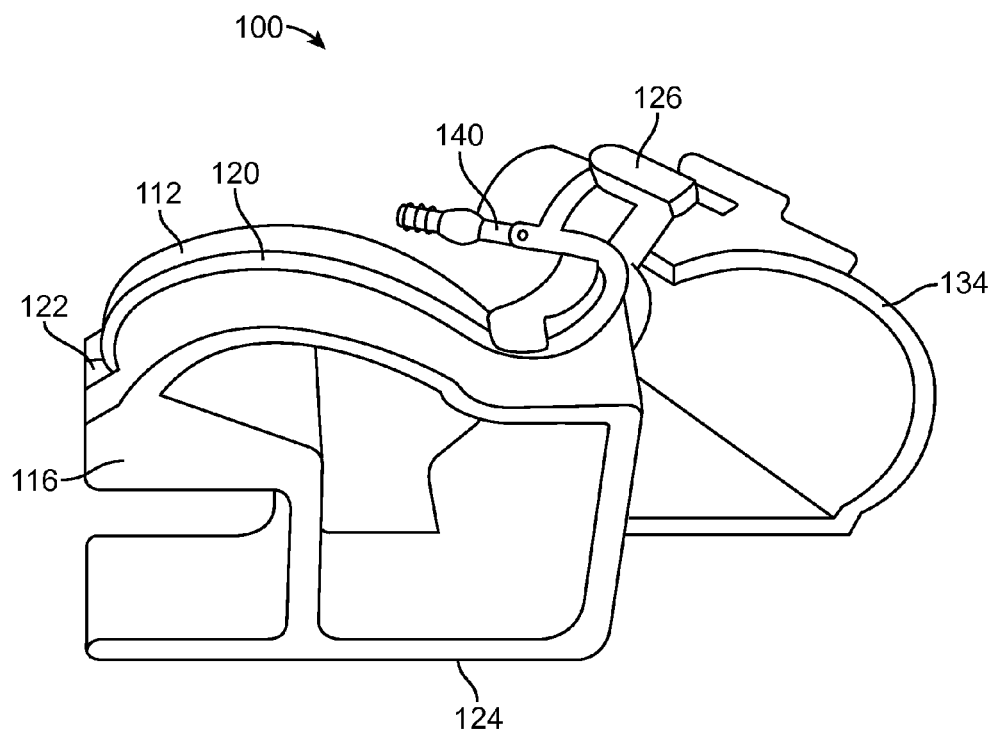
FIG. 8 is a photo of the holder of FIG. 6 from the side.

FIGS. 3 to 8 illustrate a holder according to the present invention from different sides. FIGS. 6-8 are photos of the holder with the sound tube attached.

The holder 100 has a surface 112, 114 imparting the specific shape to the sound tube, and attachment elements 116, 118 for fixing the sound tube to the holder 110 keeping the sound tube in abutting contact with the surface 112, 114.

The surface 112 of the holder 100 is curved to impart a first bend to the sound tube, the first bend being intended to extend from a BTE hearing aid housing to be worn behind the ear and over the top of the ear of a user when the user wears the hearing aid with the pre-formed sound tube.

The surface 112 imparting the first bend further comprises a groove 120 for reception and guidance of the sound tube.

Figure 4:
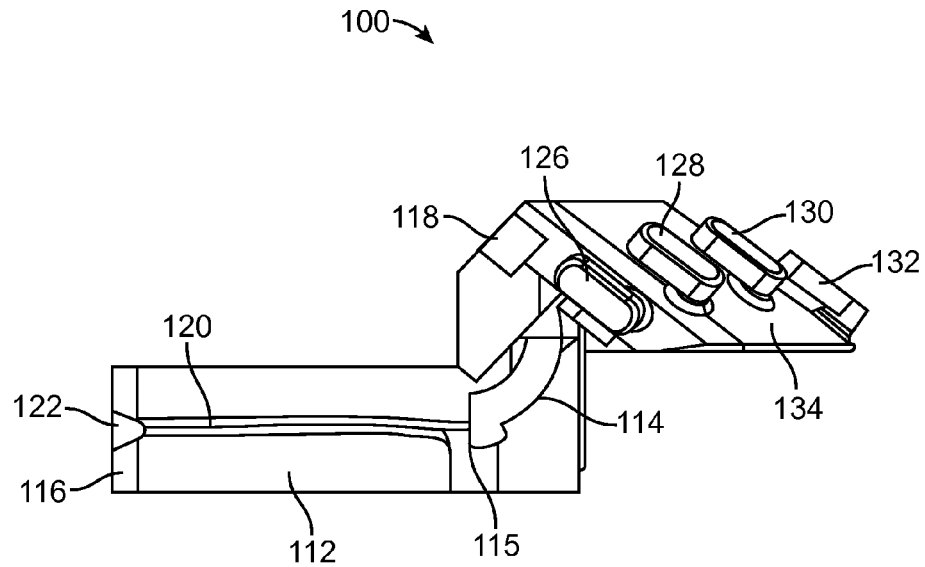
FIG. 4 is a top view of the holder shown in FIG. 3.
Figure 5:
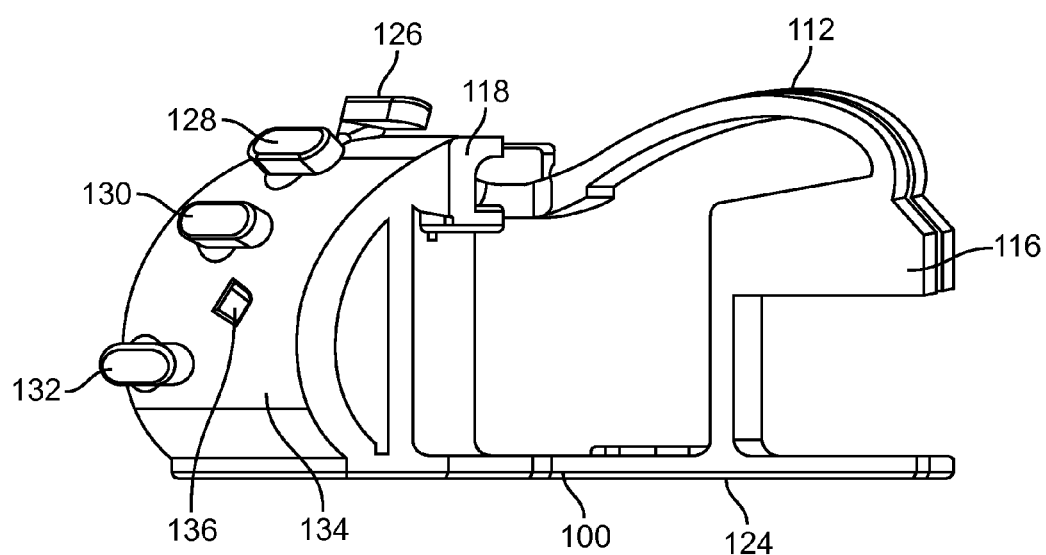
FIG. 5 is a perspective view from the other side of the holder shown in FIG. 3.

The surface 114 of the holder 100 further imparts a second bend intended to extend from outside the ear into the ear canal of the user when the user wears the hearing aid with the pre-formed sound tube. As shown in FIG. 4, the first bend that coincides with the groove 120 extends along a curve in a plane perpendicular to the plane of the drawing, and likewise, the second bend coinciding with the surface 114 extends along a curve in the plane of the drawing, i.e. substantially perpendicular to the plane of the first bend.

The surface 114 is formed by an arcuate protrusion perpendicular to the surface from which it protrudes. The arcuate protrusion contains a small tap 115 for passage of the sound tube underneath the tap 115.

The attachment element 116 comprises a groove 122 adapted to receive and hold the sound tube, and the groove 122 ends in a compartment (not visible) for accommodating the first connector of the sound tube. The compartment has a conical shape facilitating insertion of the first connector into the compartment and preventing unintentional removal of the sound tube upon mounting of the sound tube in the holder 100.

The attachment element 118 is shaped as a protrusion holding the second connector substantially in the plane of the second bend, or as a fork or a "U" for reception and accommodation of the second connector. The resilience of the sound tube urges the second connector into abutment of the base of the protrusion or the bottom of the fork or "U" 118 thus assisting in keeping the sound tube attached to the holder 100 until intentional removal.

Further, the holder 100 has a flat bottom surface 124 for easy positioning of the holder for example on a conveyor belt (not shown).

The holder 100 comprises further attachment elements 126, 128, 130, 132 that are adapted to receive and hold the resilient fibre that is connected to the sound tube and intended for abutting a lower part of the concha when the hearing aid is worn thereby providing retention of the hearing aid earpiece in the ear canal of the user. The attachment elements 126, 128, 130, 132 form L-shaped protrusions from a curved surface 134 imparting the specific curved shape to the fibre, providing a space between the surface 134 and the legs of the L-shaped protrusions that are slightly less than the diameter of the fibre for easy insertion into and detainment of the fibre by the protrusions 126, 128, 130, 132. The holder 100 comprises a further attachment element 136 in the form of a protrusion with a height that corresponds to the fibre diameter for retention of the fibre underneath the L-shaped protrusions.

Holders 100 of different sizes corresponding to respective standard sizes of sound tubes may be made in different colours for easy recognition.

The holders 100 may further contain markings 138 integrated in the material, e.g. indicating left or right, and/or colour, ID number, size code, etc.

In one embodiment, the manufacturing process of a standard sized sound tube comprises the steps of unreeling a desired length of sound tube from a storage reel, cutting the desired length of sound tube, overmoulding the first connector, overmoulding the second connector including the fibre, mounting the sound tube onto the holder 100 by first inserting the first connector into the compartment, bending the sound tube along the groove 120 and inserting the sound tube underneath the tap 115 following the surface 114, and inserting the second connector underneath the protrusion 118, or in the fork shaped attachment element 118, inserting the fibre underneath the L-shaped elements 126, 128, 130, 132 behind the protrusion 136, positioning the holder with the sound tube for example onto a conveyor belt, moving the holder and sound tube through a heating tunnel followed by a cooling tunnel, and finally removing the pre-formed sound tube from the holder.

An indication 140 of the type, e.g. size and right or left side, may be printed on the second connector as shown in FIG. 8.

Figure 9:
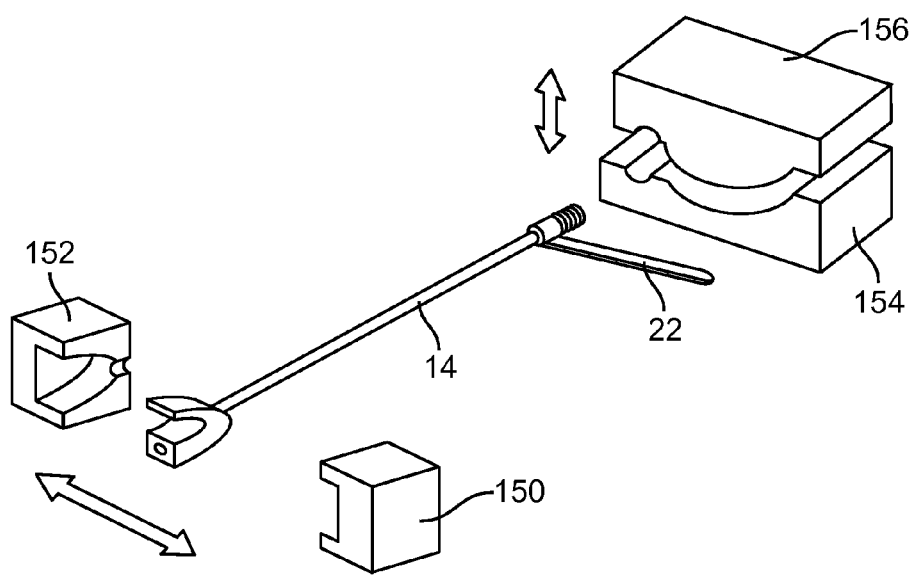
FIG. 9 shows in perspective attachment elements comprising gripping devices.
Figure 10:
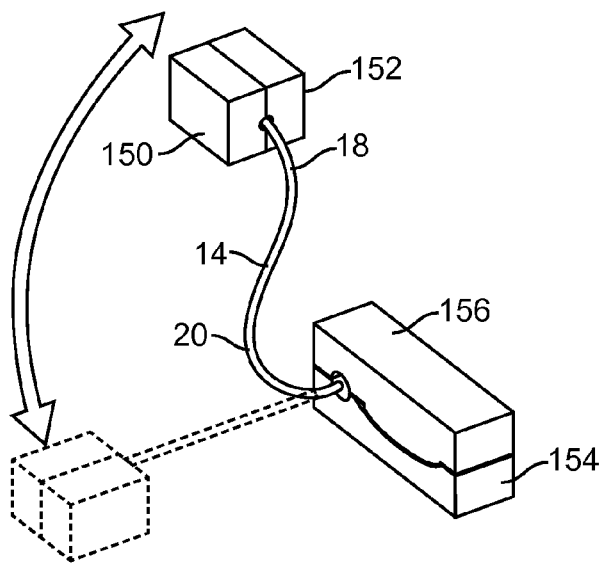
FIG. 10 shows the positions of the gripping devices during heating.
Figure 11:
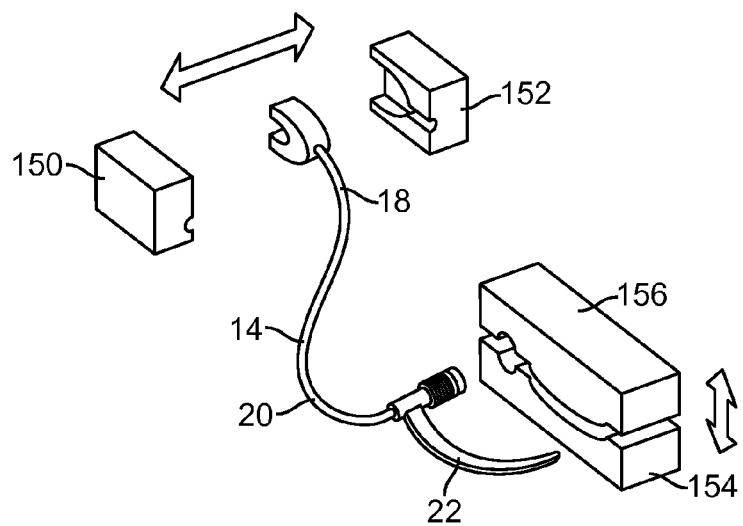
FIG. 11 illustrates release of the sound tube from the gripping devices upon cooling.

FIGS. 9-11 illustrate an embodiment with attachment elements comprising gripping devices 150, 152; 154, 156. In the illustrated embodiment, the sound tube 14 is attached to two gripping devices 150, 152; 154, 156 at its end points, however, other embodiments may comprise more than two gripping devices 150, 152; 154, 156, and the gripping devices may hold other specific parts of the sound tube 14 in other specific positions thereby, in cooperation, imparting the desired shape to the sound tube 14. The mechanical structure supporting the gripping devices 150, 152; 154, 156 is not shown. The gripping device 150, 152 encloses a chamber that fits the first connector of the sound tube 14 and is divided into a first part 150 and a second part 152 that is closed around the first connector whereby the first connector is attached to the gripping device 150, 152. Likewise, the gripping device 154, 156 encloses a chamber that fits the second connector and the fibre 22 and is divided into a first part 154 and a second part 156 that is closed around the second connector whereby the second connector is attached to the gripping device 154, 156.

The gripping devices 150, 152; 154, 156 may for example be attached to a robot (not shown) that controls the positions of the opening and closing of the gripping devices 150, 152; 154, 156 and the positioning of the gripping devices 150, 152; 154, 156. After attachment of the sound tube 14 to the gripping devices 150, 152; 154, 156, the robot moves the gripping devices 150, 152; 154, 156 into the positions as illustrated in FIG. 10 thereby imparting the desired shape to the sound tube 14. Then, heating of the sound tube is performed. Upon cooling, the robot opens the gripping devices 150, 152; 154, 156 to release the sound tube 14 in its desired shape.

The invention claimed is:

1. A shaping tool for bending a component of a hearing aid for wear by a user of the hearing aid, the component comprising an elongated member having a first part, a second part, and a third part between the first and second parts, the first part of the elongated member having a connector, the tool comprising:
a first portion comprising a first receiving element configured to receive and hold the connector;
a second portion comprising a second receiving element configured to receive the second part of the elongated member, the second receiving element having at least two sides defining at least a part of a space for accommodating the second part of the elongated member; and
a third portion at an operative position relative to the first and second portions, the third portion configured for engagement with the third part of the elongated member to provide a curved configuration for the third part of the elongated member, so that the third part of the elongated member curves in a plane that is at an angle relative to a longitudinal axis of the second part of the elongated member received by the second portion;
wherein the first portion, the second portion, and the third portion are fixed in position relative to each other.

2. The tool of claim 1, wherein the third portion comprises a curvilinear groove for stabilizing the third part of the elongated member.

3. The tool of claim 1, further comprising a fourth portion for engagement with a fourth part of the elongated member.

4. The tool of claim 3, wherein the third portion is configured to provide a first bend with the curved configuration at the third part of the elongated member for the hearing aid, and the fourth portion is configured to provide a second bend at the fourth part of the elongated member.

5. The tool of claim 1, further comprising a first gripping portion that detachably couples to the first portion of the tool, wherein the first gripping portion cooperates with the first portion to hold the connector relative to the tool.

6. The tool of claim 5, further comprising a second gripping portion that detachably couples to the second portion of the tool, wherein the second gripping portion cooperates with the second portion to hold the second part of the elongated member relative to the tool.

7. The tool of claim 1, wherein the first, second, and third portions are formed using a rapid prototyping process.

8. The tool of claim 7, wherein the rapid prototyping process comprises a selective laser sintering process.

9. The tool of claim 1, wherein the first portion and the second portion are configured to prevent the first and second parts of the elongated member from moving relative to each other.

10. The tool of claim 1, wherein the first portion comprises a slot.

11. The tool of claim 1, further comprising a holder for holding an additional elongated member for the hearing aid, wherein the additional elongated member is directly or indirectly coupled to the elongated member.

12. The tool of claim 1, further comprising a marking formed on a surface of the tool, the marking indicating one or more of left, right, color, identification number, and size code.

13. The tool of claim 1, further comprising the elongated member, wherein the elongated member comprises a hollow tube for transmitting sound.

14. The tool of claim 1, further comprising the elongated member, wherein the elongated member is configured for conduction of electrical signals.

15. The tool of claim 1, wherein the first portion, the second portion, and the third portion are positioned relative to each other in the manner that provides a bent shape for the elongated member.

16. The tool of claim 1, wherein the first portion, the second portion, and the third portion are made from a material that allows them to be heated with the elongated member to thereby set the shape of the elongated member.

17. The tool of claim 1, wherein the first portion defines a first slot that extends in a first direction, and the second portion defines a second slot that extends in a second direction, wherein the second direction is different from the first direction.

18. The tool of claim 1, wherein the first portion has two gripping members that are moveable relative to each other in an elastic configuration.

19. The tool of claim 1, wherein the second portion at least partially defines a slot for accommodating the second part of the elongated member, the slot having an axis that forms an angle with the plane.

20. The tool of claim 1, further comprising a fourth portion that at least partially defines a space for accommodating a fourth part of the member.

21. The tool of clam 20, wherein the space at least partially defined by the fourth portion accommodates the fourth part of the member with a curved section.

22. The tool of claim 1, wherein the at least a part of the third portion comprises an exterior surface for engaging an exterior part of the third part of the elongated member.

23. The tool of claim 1, wherein the first portion, the second portion, and the third portion are parts of a block that has a block-like configuration.

24. The tool of claim 1, wherein the second part of the elongated member comprises an elongated portion and a connector coupled to the elongated portion, and the second receiving element is configured to accommodate the connector at the second part of the elongated member.

25. The tool of claim 1, wherein the second part of the elongated member comprises an elongated portion of the elongated member, and the second receiving element is configured to accommodate the elongated portion of the second part.

26. A shaping tool for bending a component of a hearing aid for wear by a user of the hearing aid, the component comprising an elongated member having a first part, a second part, and a third part between the first and second parts, the first part of the connector having a connector, the tool comprising:
- a first portion comprising a first receiving element configured to receive and hold the connector at the first part of the elongated member;
- a second portion comprising a second receiving element configured to receive the second part of the elongated member, the second receiving element providing at least two contacting points for engagement with the second part of the elongated member; and
- a third portion at a fixed operative position relative to the first and second portions, the third portion configured for engagement with the third part of the elongated member to provide a curved configuration for the third part of the elongated member, so that the third part of the elongated member curves in a plane that is at an angle relative to a longitudinal axis of the second part of the elongated member received by the second portion.

27. The tool of claim 26, further comprising a fourth portion that at least partially defines a space for accommodating a fourth part of the member.

28. The tool of claim 27, wherein the space at least partially defined by the fourth portion accommodates the fourth part of the member with a curved section.

29. The tool of claim 27, wherein the fourth portion has a curvilinear profile that lies in a plane that is different from the plane in which the third part of the elongated member curves.

30. The tool of claim 26, wherein the at least a part of the third portion comprises an exterior surface for engaging an exterior part of the third part of the elongated member.

31. The tool of claim 26, wherein the first portion, the second portion, and the third portion are parts of a block that has a block-like configuration.

32. The tool of claim 26, wherein the second part of the elongated member comprises an elongated portion and a connector coupled to the elongated portion, and the second receiving element is configured to accommodate the connector at the second part of the elongated member.

33. The tool of claim 26, wherein the second part of the elongated member comprises an elongated portion of the elongated member, and the second receiving element is configured to accommodate the elongated portion.

34. The tool of claim 26, wherein the first, second, and third portions are formed using a rapid prototyping process.

35. The tool of claim 34, wherein the rapid prototyping process comprises a selective laser sintering process.

36. A method for bending a component of a hearing aid, the component comprising an elongated member having a first part, a second part, and a third part between the first and second parts, the first part of the elongated member having a connector, the tool comprising:
- holding the connector at the first part of the elongated member using a first portion of a tool;
- receiving the second part of the elongated member using a second portion of the tool, the second portion of the tool having at least two sides defining at least a part of a space for accommodating the second part of the elongated member; and
- engaging the third part of the elongated member with a third portion of the tool, so that the third part of the elongated member curves in a plane that is at an angle relative to a longitudinal axis of the second part of the elongated member received by the second portion of the tool;
- wherein the acts of holding and the act of engaging provide a shape of the elongated member for wear by a user of the hearing aid.

37. The method of claim 36, further comprising:
- unreeling a desired length of the elongated member from a storage reel; and
- cutting the desired length of the elongated member.

38. The method of claim 36, further comprising:
- overmoulding a first connector at a first end of the elongated member; and
- overmoulding a second connector at a second end of the elongated member.

39. The method of claim 36, further comprising:
- heating the tool with the elongated member;
- cooling the tool with the elongated member; and
- removing the elongated member from the tool.

40. The method of claim 36, wherein the third portion of the tool comprises a curvilinear surface, the third part of the elongated member comprises a first intermediate part of the elongated member, and the first intermediate part is engaged against the curvilinear surface to thereby provide a first bend for the first intermediate part of the elongated member.

41. The method of claim 40, further comprising engaging a second intermediate part of the elongated member with a fourth portion of the tool to thereby provide a second bend for the second intermediate part of the elongated member.

42. The method of claim 36, further comprising shaping an additional elongated member using a fourth portion of the tool, wherein the additional elongated member is directly or indirectly coupled to the elongated member.

43. The method of claim 36, wherein the act of holding the at least a portion of the first part of the elongated member using the first portion of the tool comprises frictionally engaging the at least a portion of the first part against a holding mechanism at the first portion of the tool.

44. The method of claim 36, wherein the act of holding the at least a portion of the first part of the elongated member using the first portion of the tool comprises detachably securing a gripping portion relative to the first portion to form a chamber that houses the at least a portion of the first part of the elongated member.

45. The method of claim 36, wherein the elongated member comprises a hollow tube for transmitting sound.

46. The method of claim 36, wherein the elongated member is configured for conduction of electrical signals.

47. The method of claim 36, wherein the first portion of the tool is used to hold the elongated portion at the first part of the elongated member.

48. The method of claim 36, wherein the first portion of the tool is used to hold the connector at the first part of the elongated member.

49. The method of claim 36, wherein the first portion, the second portion, and the third portion are used to provide a bent shape for the elongated member.

50. The method of claim 36, wherein the at least a portion of the first part of the elongated member is held using the first portion so that the elongated portion at the first part points towards in a first direction, and the second part of the elongated member is held using the second portion so that the second part points in a second direction, wherein the second direction is different from the first direction.

51. The method of claim 36, wherein the act of holding the at least a portion of the first part of the elongated member comprises using two gripping members that are moveable relative to each other in an elastic configuration.

52. The method of claim 36, wherein the third portion comprises a curvilinear groove, and the act of engaging the third part of the elongated member comprises placing a portion of a length of the elongated member against the curvilinear groove.

53. The method of claim 41, wherein the first bend lies in a first plane, the second bend lies in a second plane that is different from the plane.

54. The method of claim 36, wherein an exterior part of the third part of the elongated member engages with an exterior surface at the at least a part of the third portion.

55. The method of claim 36, wherein the first portion, the second portion, and the third portion are parts of a block that has a block-like configuration.

56. The method of claim 36, wherein the act of receiving the second part of the elongated member comprises receiving an elongated portion at the second part of the elongated member.

57. The method of claim 36, wherein the act of receiving the second part of the elongated member comprises receiving a connector at the second part of the elongated member.

* * * * *